April 24, 1934.  F. B. TOOTHAKER  1,956,429
SLITTING MACHINE
Filed March 2, 1932  3 Sheets-Sheet 1

INVENTOR
Fred B. Toothaker
BY
ATTORNEYS

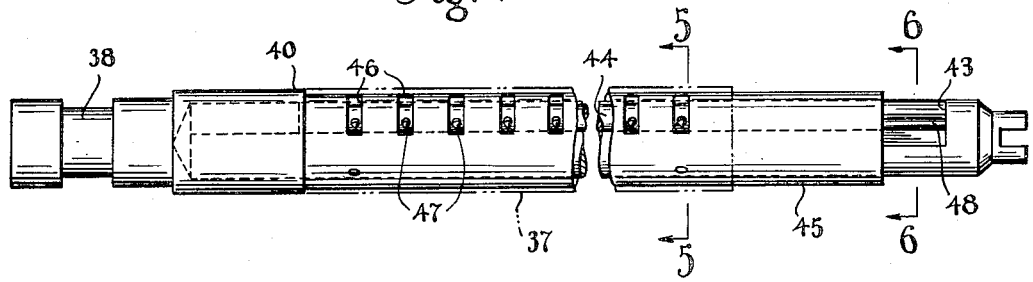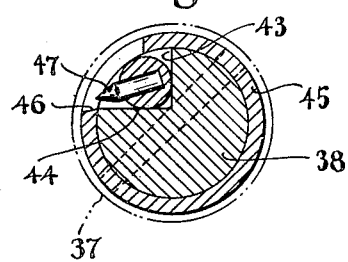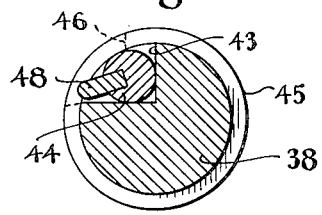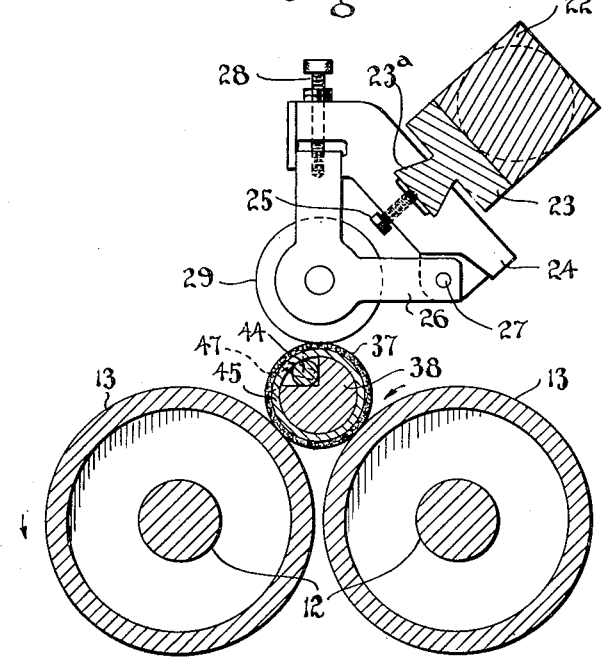

Patented Apr. 24, 1934

1,956,429

UNITED STATES PATENT OFFICE 1,956,429

SLITTING MACHINE

Fred B. Toothaker, Akron, Ohio, assignor to The Firestone Tire and Rubber Company, Akron, Ohio, a corporation of Ohio Application March 2, 1932, Serial No. 596,193

2 Claims. (Cl. 164—69)

This invention relates to slitting machines, and more especially it relates to apparatus for slitting elongate tubes, such as pasteboard tubes, transversely into a plurality of relatively short sections or rings.

The embodiment of the invention herein illustrated is used in the manufacture of base or core rings upon which lengths of adhesive or friction tape subsequently are wound, the elongate tube being mounted upon a mandrel for slitting, and the mandrel, with tube sections or rings still mounted thereon, being transferred to the winding machine for the wrapping of the tape upon the rings.

The chief objects of the invention are to provide ease and facility of manipulating the mandrel upon which the tubes are slit; to provide for peripherally driving the work as it is slit; to provide for holding the tube and the individual rings or tube-sections against movement with relation to the mandrel; and to provide for the accurate slitting of the work.

Of the accompanying drawings,

Figure 3 is a section on the line 3—3 of Figure 1;

Figure 4 is an elevation of a mandrel constituting a part of the machine;

Figure 5 is a section of the mandrel, and the work thereon, on the line 5—5 of Figure 4; and Figure 6 is a section on the line 6—6 of Figure 4.

Figure 1:
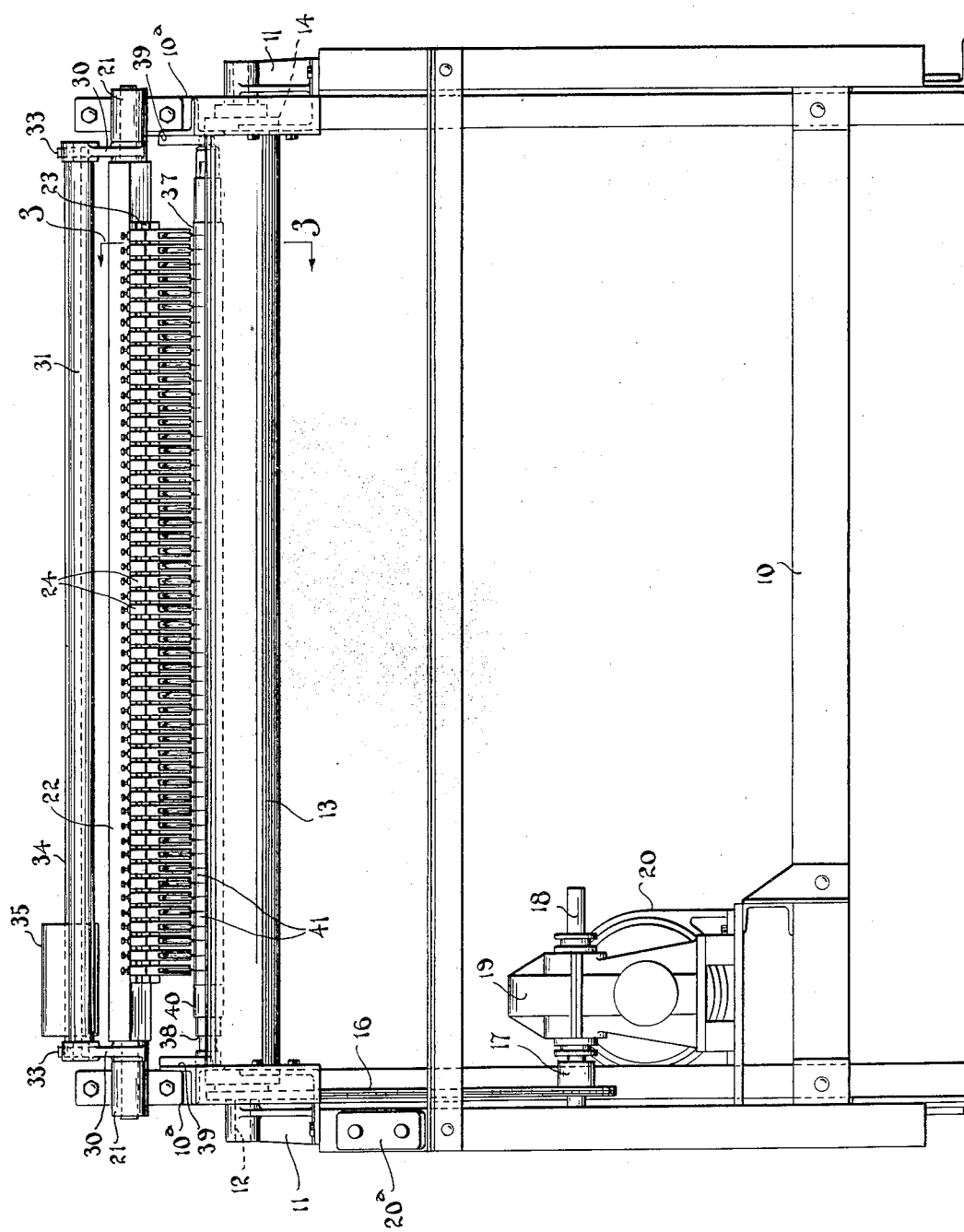
Figure 1 is a front elevation of a machine embodying the invention, in its preferred form, and the work therein.

Referring to the drawings, the machine comprises an open framework 10 having a pair of journal brackets 11, 11 mounted upon each of the members that extends from front to rear of the framework at the top and at the opposite ends thereof, said brackets serving as journals for the shafts 12, 12 of a pair of spaced, parallel, driving rollers 13, 13, which rollers are adapted to support and frictionally rotate the work. Each of the roller shafts 12 is provided with a sprocket 15, and the rollers are driven in the same direction by a sprocket chain 16 that is trained about the sprockets 15 and about a sprocket 17 that is mounted upon the shaft 18 of a reduction gear device 19, the latter being driven by a motor 20. The motor 20 and reduction gear device 19 are mounted upon the framework 10 somewhat below the rollers 13, and an electrical switch 20ª for controlling the operation of the motor 20 may be positioned upon the framework 10 for the convenience of the operator.

The framework 10 has extensions 10ª, 10ª of its rear vertical members rising above the framework at opposite ends thereof, and said extensions carry, on their front faces, respective bearing brackets 21, 21 in which are journaled the end portions of bar 22, the latter being square in section between said brackets. Mounted upon one of the flat faces of the bar 22 is an elongate plate 23 that is formed with a dovetail rib 23ª, and adjustably mounted upon the latter are a plurality of cutter brackets 24, 24 having set screws 25 for fixedly positioning them upon said dovetail. As is most clearly shown in Figure 3, each cutter bracket 24 carries an L-shaped knife holder 26 that has one arm pivotally connected to the bracket at 27, and has its other arm connected to the bracket by a threaded member 28 whereby angular adjustment of the knife holder with relation to the bracket is made possible. At its elbow each knife holder 26 carries a rotatable disc knife 29.

Figure 2:
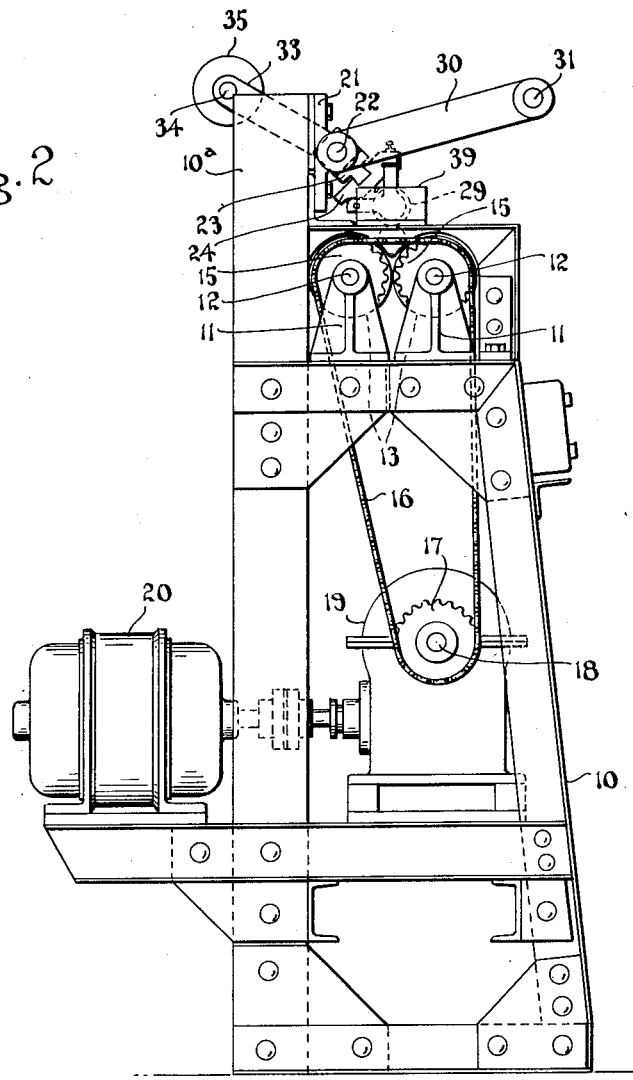
Figure 2 is an end elevation thereof, as viewed from the left of Figure 1.

The knives 29 are lowered onto the work and lifted therefrom by rotating the bar 22, and to this end the said bar is provided adjacent its respective ends with forwardly-extending arms 30, 30, the free ends of which are connected by a rod or bar 31 so that the bar 22 may be rocked from any position longitudinally of the machine. The arms 30 have rearward extensions, such as the extension 33, Figure 2, and said extensions are connected by a bar 34 upon which a counterweight 35 is mounted. The arrangement is such that the counterweight will hold the slitter knives in elevated position, away from the work, after the bar 22 has been manually rocked to proper angular position by the lifting of bar 31. The cutters are manually urged against the work to slit the same by the operator who bears down upon bar 31.

The work, initially consisting of an elongate tube 37 of pasteboard or the like, is supported during the slitting operation upon a generally cylindrical mandrel generally designated 38. In the slitting operation the mandrel rests in the bite of the rollers 13 so as to be driven thereby, the ends of the mandrel lightly abutting respective guide-plates 39, 39 positioned at opposite ends of the machine. The provision of guide plates 39 is for the purpose of accurately positioning the mandrel longitudinally with relation to the slitter knives 29, and the mandrel is provided near one end with a collar or shoulder 40 by which the work is accurately positioned longitudinally of the mandrel. The arrangement is such that after the work 37 is slit into a plurality of sections or rings 41, 41, the mandrel with the work thereon may be transferred to another machine, such as a machine for wrapping tape on the rings, and the said rings will be aligned with the respective lengths of tape delivered by said machine.

The mandrel 38 is formed with a longitudinal groove or recess 43, and mounted in said recess is a round bar or shaft 44 that is retained therein by an elongate sleeve 45, the arrangement being such that the shaft 44 is angularly rotatable. The sleeve 45 is formed at regular intervals, corresponding to the width of the rings 41, with transversely disposed arcuate slots 46, 46, which slots are coincident with the groove 43 and accommodate respective sharpened pins or studs 47, 47 projecting from the shaft 44. The sleeve 45 does not completely cover the shaft 44, a portion of the latter being exposed at the end of the mandrel remote from the collar 40, and said exposed portion of the shaft is provided with a short, radially projecting plate 48 (Figure 6) constituting a lever by means of which the shaft 44 may be partly rotated, as by means of a suitable tool inserted between the plate 48 and the wall of the groove 43. In one position of the shaft 44 the pins 47 lie entirely below the surface of the sleeve 45, and in the other position of the shaft they project above said surface, the arrangement being such that when a tube 37 is mounted upon the sleeve 45 the shaft 44 may be turned to cause the pins 47 to impale the tube, as is shown in Figure 3, and thus to prevent relative movement of the latter, or the rings 41 with relation to the mandrel during the slitting operation and subsequent tape-wrapping operation.

The machine is simple in construction and accurate and economical in operation, and accomplishes the several objects set forth in the foregoing statement of objects.

Modifications may be resorted to without departing from the spirit of the invention or the scope of the appended claims, which are not limited wholly to the specific construction shown and described.

What is claimed is:

1. In a slitting machine, the combination of a generally cylindrical mandrel upon which the work is mounted, cradle rollers for supporting and driving the mandrel and work thereon, slitter means movable toward and away from the mandrel to sever the work thereon transversely into relatively small pieces, said mandrel fitting the inner periphery of the work whereby the latter may be backed by the mandrel while being cut by the slitter means, and respective members on the mandrel engaging the several work pieces to prevent movement thereof relative to the mandrel and to each other.

2. In a slitting machine, the combination of a generally cylindrical mandrel adapted to receive a tubular work-piece thereon, a shoulder on the mandrel for determinately positioning the work longitudinally thereof, cradle rollers for supporting and peripherally driving the work and the mandrel, means for determinately positioning the mandrel longitudinally of said cradle rollers, a plurality of slitter knives movable toward and away from the work to sever the latter into relatively short units, said mandrel fitting the inner periphery of the work whereby the latter may be backed by the mandrel while being cut by the slitter knives, and a plurality of members carried by the mandrel and spaced in determinate relation to the slitter knives for impaling the work interiorly thereof to prevent relative movement of the work with relation to the mandrel.

FRED B. TOOTHAKER.